(12) United States Patent
Matsuya et al.

(10) Patent No.: US 6,611,919 B1
(45) Date of Patent: Aug. 26, 2003

(54) METHOD AND SYSTEM FOR MANAGING COMPUTER LOW POWER MODE

(75) Inventors: Yuka Matsuya, Yamato (JP); Naoya Komoda, Yokohama (JP); Kazumi Itoh, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 09/608,517

(22) Filed: Jun. 30, 2000

(30) Foreign Application Priority Data

Jun. 30, 1999 (JP) .......................................... 11-184764

(51) Int. Cl.[7] ................................................ G06F 1/32
(52) U.S. Cl. ...................................................... 713/320
(58) Field of Search ................................ 713/300, 310, 713/320–324

(56) References Cited

U.S. PATENT DOCUMENTS 6,336,153 B1 * 1/2002 Izumida et al. ................ 710/20
6,463,307 B1 * 10/2002 Larsson et al. ............. 455/574
6,523,125 B1 * 2/2003 Kohno et al. ................ 713/320

* cited by examiner

*Primary Examiner*—Thomas M. Heckler
(74) *Attorney, Agent, or Firm*—Abdy Raissinia; Bracewell & Patterson, L.L.P.

(57) ABSTRACT

A computer system and methods for determining whether to compress the content of memory in a computer system, optionally including video memory, prior to storing the contents of memory within a non-volatile storage device prior to entering a hibernation mode where power is disabled to memory. An evaluation of the actual performance of computer system speed in storing and retrieving a file having the content of memory and decompressing the file is made to determine whether time is saved as a result of reducing the size of the file by compressing as compared to the time to compress and decompress the file. The evaluation of actual computer system performance takes place after each exit from hibernation mode and a determination is made whether to compress the content of memory the next time a hibernation mode request occurs in response to that evaluation.

16 Claims, 3 Drawing Sheets

METHOD AND SYSTEM FOR MANAGING COMPUTER LOW POWER MODE

TECHNICAL FIELD

The present invention relates in general to methods for computer low power modes and, in particular, to entering and exiting computer low power modes. Still more particularly, the present invention relates to optimizing the speed at which computer low power modes are entered and exited.

DESCRIPTION OF THE RELATED ART

Various types of low power modes are incorporated into computer systems which utilize a hibernation mode, commonly known as "sleep" mode or low power mode where power sources to internal components, such as main memory, are essentially disabled to conserve power during periods of non-use.

Prior art methods commonly save the contents of main memory on a hard disk drive prior to entering hibernation mode. Known methods for enhancing performance include compressing the memory contents prior to storing on the hard disk drive as a file and then reading and decompressing the file containing the memory contents when hibernation mode is exited. The compression of the file may result in a significantly smaller file, which in some situations will reduce the transfer time to and from the hard disk drive. However, when the reduction in the size of the file is small, the time to execute compression and decompression may take more time then is saved by having a smaller sized file. For this reason, conventional methods commonly specify a minimal reduction in size, usually in terms of a percentage of the original file size, which must be achieved before file compression is used. Commonly, an evaluation is made each time hibernation mode is exited (i.e. wake-up) of whether the actual reduction in size is greater then the minimal specified amount to determine whether compression takes place the next time hibernation mode is entered.

FIG. 3 shows a flow chart for explaining this prior art method. An area is reserved on the hard disk drive (step S21). The first time hibernation mode is entered, a file containing the contents of memory, including video memory, is compressed (step S22). The size of the file before compression C1 and after compression C2 is determined in step S23. Hibernation mode is entered and power to main memory and VRAM is disabled in step S24. At a latter time, the computer wakes-up in step S25: power is restored to internal circuits, and the computer returns to normal operation. The next time hibernation mode is about to be entered, the ratio of the difference between the size of memory contents before compression C1 and after compression C2 to the size of the memory content C1 is compared to a specified value X. When the ratio ((C1−C2)/C1) is greater then the specified minimum value X, the memory contents are compressed prior to the next time hibernation mode is entered. Otherwise, when the ratio ((C1−C2)/C1) is equal or smaller then the specified minimum value X, compression does not take place prior to next time hibernation mode is entered.

The minimal value X is fixed for a particular system and is typically selected based on the performance of the CPU, memory, and hard disk drive. Changes in components and in the system environment that effect a computer system's speed can result in the specified fixed minimal value X no longer providing an accurate indicator of when compression accelerates or decelerates the transitions in and out of hibernation mode. As the speed of computer components continues to advance, the ability to maintain an accurate value for X becomes more difficult when components are changed.

A method is needed that determines the specified minimum value X based on actual system performance and automatically updates the minimum value X to comprehend changes in a computer's components that effect speed.

SUMMARY OF THE INVENTION

The methods of the present invention determine, based on actual performance, the amount of data compression required for the compression to accelerate the processes for entering and exiting hibernation mode.

A method for managing a computer hibernation mode, where in response to a request to enter a hibernation mode, the contents of a memory are compressed and stored to a non-volatile storage, such as a hard disk drive. Hibernation mode is entered in which power is disabled to memory. After hibernation mode is exited and power is enabled to memory, the contents of memory are read from the non-volatile storage and decompressed. An evaluation is made, based on actual performance, whether the compression and decompression provided for increased performance and a determination is made, according to said evaluation results the next-time in which a hibernation request is made, whether to compress the memory contents prior to saving on the hard disk drive The contents of a video memory as well as main memory may be stored on the hard disk drive, while the system is in hibernation mode.

The evaluation may include measuring the actual rate in which data is read from the non-volatile storage. An equation may be utilized for the evaluation: $Y-(BX)/A < C/(XA)$, where Y is time to read and decompress a file comprising said stored contents of said memory, B is the size of said file after compression, X/A is the measured rate at which data is read from said non-volatile storage device, and C is the difference between said file before compression and said file after compression.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
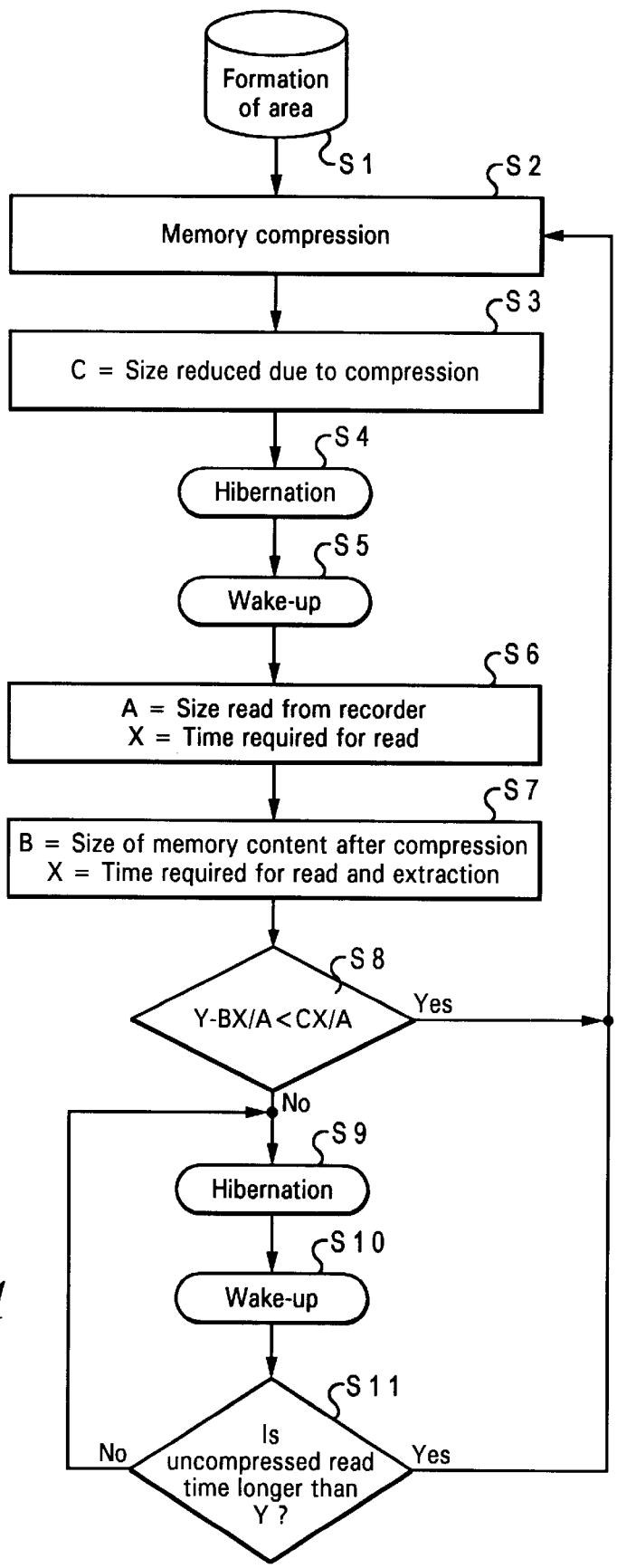
FIG. 1 depicts an illustrative embodiment of a flow diagram with which the method and system of the present invention may advantageously be utilized.

With reference now to the figures and in particular with reference to FIG. 1, there is illustrated a flow chart used within a computer system that advantageously utilizes the methods of the present invention. An assumption is made that there is a difference between the operational efficiency of process of entering hibernation mode and the process of exiting hibernation mode (i.e. wake-up). Either process, hibernation or wake-up, is selected for optimization. FIG. 1 shows a method for optimizing the wake-up process. This method may be applied to optimize the hibernation mode by measuring performance while entering hibernation mode rather then performance while exiting hibernation mode.

In step S1, an area for storing the contents of memory is reserved on a storage device such as a hard disk drive. The first time hibernation mode is to be entered, the contents of main memory and VRAM are compressed and saved in a file to the hard disk drive in step S2. C is determined in step S3, which is the difference in size of the memory contents before and after compression. Hibernation mode, where power to the computer is essentially turned off, is entered in step S4 and exited in step S5, at which point power is restored to the system.

The actual efficiency of using compression is determined in steps S6, S7, and S8. The time X to read the contents of stored file having a size A is measured during the wake-up process of step S5. A method for measuring time X can be accomplished by using a timer or counter integrated into the computer system. B is the size of the stored contents of memory after compression. Y is measured, which is the time to read and expand a stored file having B size. The rate at which stored data of the hard disk drive is read is (X/A). Assuming that A is a single unit of measure, then the time to read file having B size from the hard disk drive is (BX/A). The time to decompress the stored contents of memory is (Y−BX/A). The time saved by compressing a file is (CX/A), which is the difference in size before and after compression multiplied by the rate at which data is read from the hard disk drive. Thus, when the time to decompress a file having the stored contents of memory (Y−BX/A) is less the time saved by compression (CX/A), then compression results in greater efficiency and faster exit from hibernation mode. When C is such that compression saves time, then the next time hibernation mode is about to be entered, the contents of memory are compressed prior to storage on the hard disk drive. Otherwise when C is such that compression does not save time, the contents of memory are not compressed prior to storage on the hard disk drive.

Figure 2:
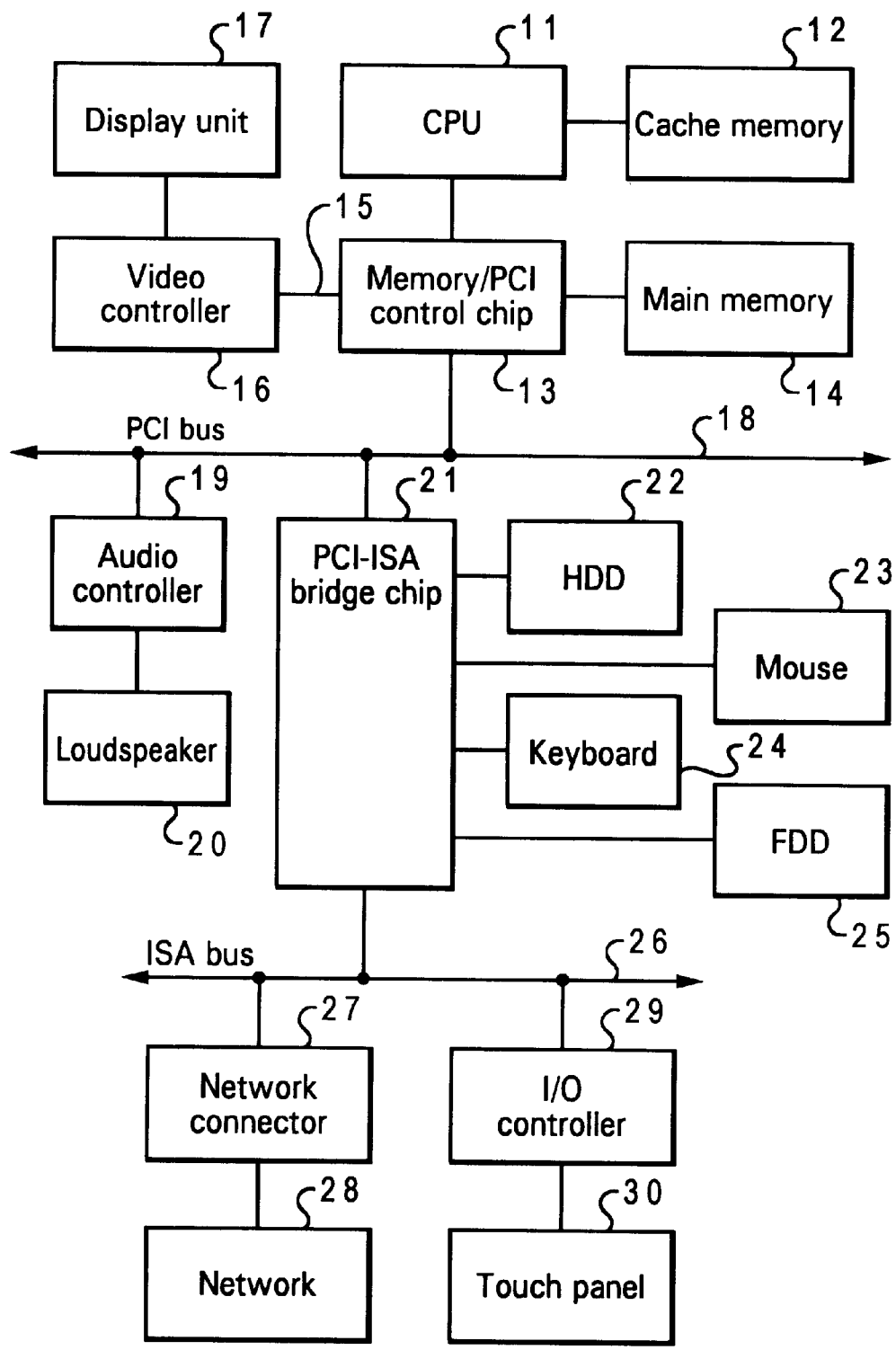
FIG. 2 depicts an embodiment of a computer which may be utilized to implement the present invention.
Figure 3:
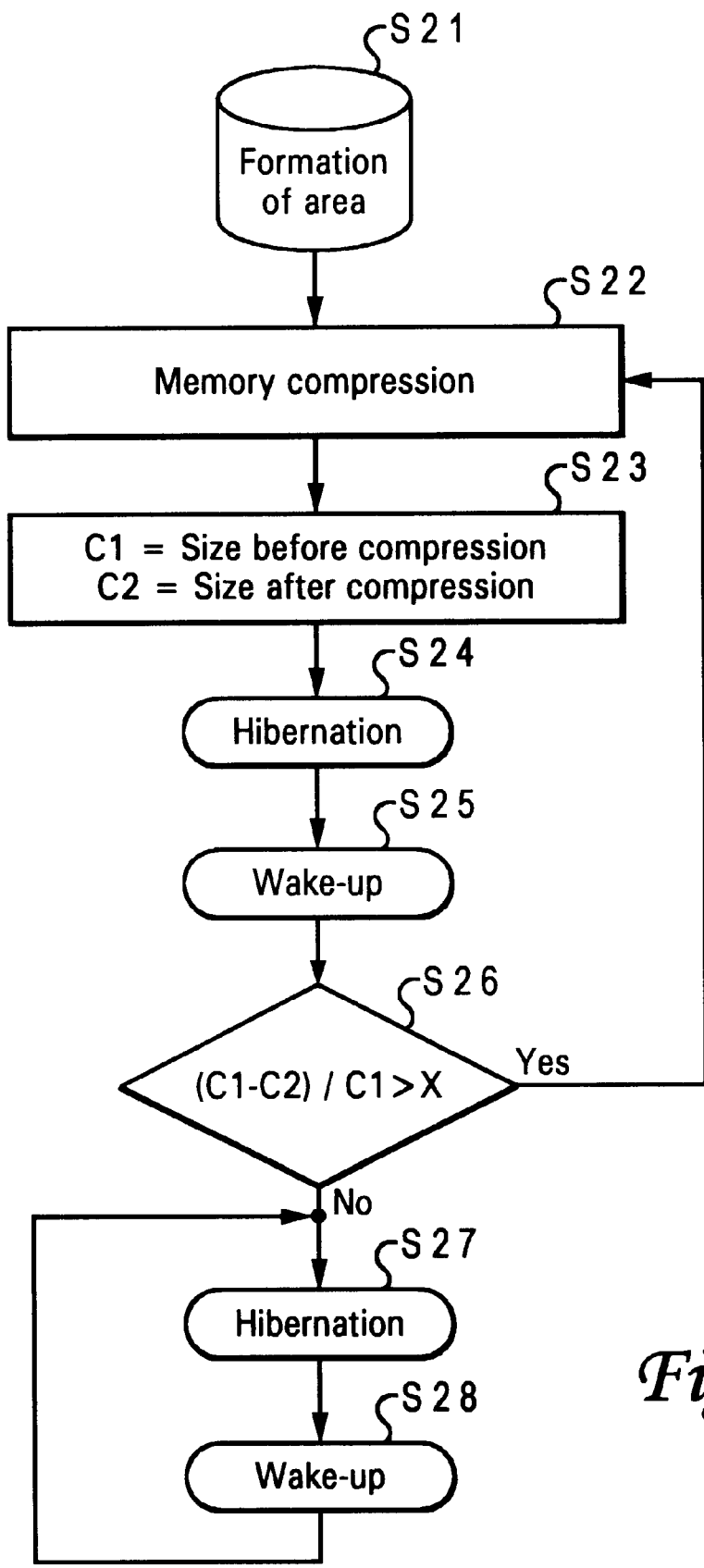
FIG. 3 shows a flow diagram illustrating a method of prior art.

Now referring to FIG. 2, which shows a block schematic diagram of the primary components of a computer in which the methods of the present invention are advantageously applied. The computer 10 is comprised of a central processing unit 11, cache memory 12, memory/PCI (Peripheral Component Interconnect bus) control chip 13, main memory 14, AGP (accelerated graphics port) 15, video controller 16, display unit 17, PCI bus 18, audio controller 19, loud speaker 20, PCI-ISA bridge chip 21, hard disk drive (HDD) 22, mouse 23, keyboard 24, floppy disk driver (FDD) 25, ISA bus 26, network connector 27, network 28, I/O controller 29, and a touch panel 30. Other components are included which are not shown and not all of the primary components shown are required for utilizing the methods of the present invention.

The process by which computer 10 enters hibernation mode includes storing the contents of main memory 14 on the hard disk drive 22 through the memory/PCI control chip 13, PCI bus 18, and PCI-ISA bridge chip 21 under the control of the CPU 11. The method illustrated by FIG. 1 is used to determine whether or not the contents of main memory 14 are compressed prior to storing on the hard disk drive 22. System power is essentially disabled and the system enters a hibernation mode. When the system wakes-up, and power is restored, the stored contents of main memory 14 are retrieved from the hard disk drive 22 and written to main memory 14 under the control of the CPU 11.

An example of a software configuration which can utilize the present invention includes an application program, device driver, operating system (OS), power management program, and a program for controlling the hibernation process. The application program, device driver, and operating system utilize main memory. A video controller is used through a video device driver. The operating system, which includes a power management function, sends a user initiated hibernation request to a hibernation program. The hibernation program stores the contents of main memory and video memory to a storage device such as a hard disk drive.

While the invention has been particularly shown and described with reference to a preferred embodiment, it will be understood by those skilled in the art that various changes in form and detail may be made therein without departing from the spirit and scope of the invention.

What is claimed is:

1. A method for managing a computer hibernation mode in a computer having memory and non-volatile storage, comprising the steps of:

receiving a request for entering a hibernation mode;

compressing contents of a memory;

storing said contents of said memory to a non-volatile storage;

entering said hibernation mode, wherein power is disabled to said memory;

exiting said hibernation mode, wherein power is enabled to said memory;

decompressing said contents of said memory;

writing said contents of said memory from said non-volatile storage to said memory;

evaluating, based on actual performance, whether or not said compression and decompression provides for increased performance; and determining the next time a hibernation request is made whether or not to execute said compressing and decompressing steps in response to said evaluation results.

2. The method of claim 1, wherein said evaluation, based on actual performance, of whether said compression and decompression provides for increased performance, includes calculating a difference between a size of said contents of said memory before said compressing and after said compressing.

3. The method of claim 1, wherein said evaluation, based on actual performance, of whether said compression and decompression provides for increased performance, includes measuring an actual rate in which said memory contents are read from said non-volatile storage.

4. The method of claim 1, wherein said non-volatile storage is a hard disk drive.

5. The method of claim 1, wherein said memory contents includes contents of a video memory.

6. The method of claim 1, wherein said evaluation, based on actual performance, of whether said compression and decompression provides for increased performance, is repeated after each exit from hibernation mode.

7. The method of claim 1, wherein said evaluation, based on actual performance, of whether said compression and decompression provides for increased performance, includes evaluating whether time is saved by reducing the size of a file, comprising said memory contents as a result of compressing said file, is greater then a time to decompress said file.

8. The method of claim 1, wherein said evaluation, based on actual performance, of whether said compression and decompression provides for increased performance, includes an evaluation of the equation $Y-(BX)/A<C/(XA)$;

wherein said Y is a time to read and decompress a file comprising said stored contents of said memory, said B is a size of said file after compression, said X/A is a measured rate at which data is read from said non-volatile storage device, and said C is a difference between said file before compression and said file after compression.

9. A computer system, comprising:

a memory having a power source;

a non-volatile storage;

a hibernation control for entering a hibernation mode in response to a request, whereby contents of said memory are selectively compressed and stored within said non-volatile storage and said power source is disabled, and for exiting said hibernation mode in response to a request, wherein said power source is enabled and said contents of said memory are retrieved from said non-volatile storage and selectively decompressed;

a performance evaluator for determining an actual performance of said entrance to or said exit from said hibernation mode; and a control process for determining whether or not to select said compression and said decompression when a subsequent request is responded to, wherein said determination is based on said actual performance of a previous entrance or a previous exit of said hibernation mode.

10. The computer system of claim 9, wherein said performance evaluator determines said actual performance based on a calculation of the difference between a size of a said contents before said compression and a size of said contents after said compression.

11. The computer system of claim 9, wherein said performance evaluator determines said actual performance based on the measured rate at which content is read from said non-volatile storage.

12. The computer system of claim 9, wherein said non-volatile storage is a hard disk drive.

13. The computer system of claim 9, wherein said memory contents includes the contents of a video memory.

14. The computer system of claim 9, wherein said performance evaluator determines said actual performance after each exit from hibernation mode.

15. The computer system of claim 9, wherein said performance evaluator determines said actual performance based on an evaluation of whether time is saved, by reducing the size of said memory contents as a result of compressing said contents, is greater than a time required to decompress said contents.

16. The computer system of claim 9, wherein said performance evaluator determines said actual performance based on the evaluation of the equation $Y-(BX)/A<C/(XA)$, wherein said Y is time to read and decompress said stored contents of said memory, said B is size of said contents after compression, said X/A is a measured rate at which said contents is read from said non-volatile storage device, and said C is a difference between said contents before compression and said contents after compression.

\* \* \* \* \*